(12) United States Patent
Sánchez Ramos

(10) Patent No.: US 8,570,648 B2
(45) Date of Patent: *Oct. 29, 2013

(54) MATERIAL FOR COVERING, COATING OR SCREENING FOR EYE PROTECTION AND THERAPY AGAINST THE EFFECTS OF BLUE LIGHT

(75) Inventor: Celia Sánchez Ramos, Madrid (ES)

(73) Assignee: Universidad Complutense de Madrid, Madrid (ES)

( * ) Notice: Subject to any disclaimer, the term of this patent is extended or adjusted under 35 U.S.C. 154(b) by 558 days.

This patent is subject to a terminal disclaimer.

(21) Appl. No.: 12/738,260

(22) PCT Filed: Nov. 5, 2007

(86) PCT No.: PCT/ES2007/000626
§ 371 (c)(1),
(2), (4) Date: Jul. 27, 2010

(87) PCT Pub. No.: WO2009/050308
PCT Pub. Date: Apr. 23, 2009

(65) Prior Publication Data
US 2010/0282266 A1   Nov. 11, 2010

(30) Foreign Application Priority Data

Oct. 15, 2007   (ES) .................................. 200702695

(51) Int. Cl.
*A61F 9/00* (2006.01)
*G02B 5/22* (2006.01)

(52) U.S. Cl.
USPC .......................................... 359/361; 128/858

(58) Field of Classification Search
USPC .......................................... 359/361; 128/858
See application file for complete search history.

(56) References Cited

U.S. PATENT DOCUMENTS

| | | | | | |
|---|---|---|---|---|---|
| 4,885,114 | A | * | 12/1989 | Gordon et al. | 252/589 |
| 5,047,447 | A | * | 9/1991 | Gallas | 523/106 |
| 5,400,175 | A | * | 3/1995 | Johansen et al. | 359/361 |
| 5,428,474 | A | * | 6/1995 | Murphy | 359/361 |
| 6,674,587 | B2 | * | 1/2004 | Chhabra et al. | 359/888 |
| 6,825,975 | B2 | * | 11/2004 | Gallas | 359/350 |
| 7,520,608 | B2 | * | 4/2009 | Ishak et al. | 351/159.65 |
| 7,832,903 | B2 | * | 11/2010 | Ramos | 362/293 |
| 8,048,343 | B2 | * | 11/2011 | Gallas et al. | 252/582 |
| 8,092,909 | B2 | * | 1/2012 | Yong et al. | 428/411.1 |
| 8,133,414 | B2 | * | 3/2012 | Gallas et al. | 252/586 |
| 2004/0042072 | A1 | * | 3/2004 | Gallas | 359/356 |
| 2005/0041299 | A1 | * | 2/2005 | Gallas | 359/642 |
| 2011/0304906 | A1 | * | 12/2011 | Artsyukhovich et al. | 359/359 |

FOREIGN PATENT DOCUMENTS

| WO | WO-9003954 A1 | 4/1990 |
|---|---|---|
| WO | WO-9005321 A1 | 5/1990 |
| WO | WO-9842909 A1 | 10/1998 |
| WO | WO-0014172 A1 | 3/2000 |

* cited by examiner

*Primary Examiner* — Frank Font
(74) *Attorney, Agent, or Firm* — Arent Fox, LLP

(57) ABSTRACT

The subject of the invention is a covering filtering material for protecting eyes which are healthy, pseudo-aphakic (operated for cataracts) and/or having retinal degeneratiion under short wavelengths, which results from the application of a filter with yellow pigmentation on any covering, coating or screening material with the purpose of protecting the eyes from the short wavelengths of visible spectrum from 500 to 380 nm which cause retinal degeneration. By way of example, this element may be applied in materials intended for manufacturing awnings, parasols or insulating materials or protection screens of any type. This invention avoids the difficulties and risks of the existing techniques for providing this protection for healthy and cataract-operated eyes and for improving protection for eyes undergoing neurodegenerative processes, achieving this with the simple application of a filter to common covering, coating or screening materials, thereby furnishing additional protection against neurodegenerative agents found in light (short wavelengths).

15 Claims, No Drawings

MATERIAL FOR COVERING, COATING OR SCREENING FOR EYE PROTECTION AND THERAPY AGAINST THE EFFECTS OF BLUE LIGHT

CROSS-REFERENCE TO RELATED APPLICATION

This application is a National Stage entry of International Application No. PCT/E82007/000626 filed Nov. 5, 2007, which claims priority to Spanish Patent Application No. P200702695 filed Oct. 15, 2007. The disclosure of the prior application is hereby incorporated in its entirety by reference.

SUBJECT OF THE INVENTION

The invention applies to the ophthalmology sector, falling within the category of preventative or therapeutic optical applications.

The subject of the invention is a covering filtering material for protecting eyes which are healthy, pseudo-aphakic (operated for cataracts) and/or having retinal degeneration under shortwave lengths, which results from the application of a filter with yellow pigmentation on any covering, coating or screening material with the purpose of protecting the eyes from the shortwave lengths of the visible spectrum from 500 to 380 nm which cause retinal degeneration. By way of example, this element may be applied in materials intended for manufacturing awnings, parasols or insulating materials or protection screens of any type.

STATE OF THE ART

Visual perception is the result of the eye's response to visible radiation from 380 to 760 nm. Solar radiation represents the greatest risk to vision in the environment. The sun emits UV rays and IR radiation that is mostly absorbed by the atmosphere. Solar radiation that is transmitted through the atmosphere consists of UV-B rays (from 230 to 300 nm), UV or UV-A rays (from 300 to 380 nm), visible light (from 380 to 760 nm) and IR rays (from 760 to 1400 nm). The healthy human eye freely transmits IR rays, along with most of the visible spectrum, to the retina, but the cornea and lens keep the most reactive waves of the visible spectrum (UV-B rays and the blue light portion of the visible spectrum) from reaching the retina.

The human lens, meanwhile, changes its transmission characteristics with age, intensifying its yellow colour and increasing its ability to filter UV rays and blue light. For this reason, violet light (<400 nm) is not transmitted by the lens of those over 65 years of age, while blue light transmission is substantially reduced (from 400 to 500 nm).

The retina protects itself from shortwave lengths in two ways. The first is by a heterogeneous distribution of photoreceptors, in such a way that there are no photoreceptors in the macular depression that are sensitive to blue light. Yellow pigments in the same zone also act to protect the retina.

Such natural processes used by the human eye (in the lens and retina) to protect itself from the shortest wavelengths can be seriously affected by certain pathologies and/or surgical operations:
  Cataracts, the only surgical treatment for which includes the extraction of the lens.
  A frequent aging pathology that leads to the degradation of retinal structures, age-related macular degeneration (ARMD).

It is important to keep in mind here that these two pathologies—cataracts and age-related macular degeneration—tend to converge in the same age group—those over 65. Cataracts are the main cause behind loss of sight, and ARMD of blindness, in this population sector. Moreover, the rate of. both pathologies will presumably increase, due to the rise in life expectancy, among other factors. For this reason, they are of great interest in the area of research and its application in the optics industry.

As can be seen in the scientific bibliography, a number of epidemiological studies have evaluated the association between cataract surgery and age-related macular degeneration (ARMD). The works of Klein (Klein R, Klein B E, Wong T Y, Tomany S C, Cruickshanks K J. The association of cataract and cataract surgery with the long-term incident of age-related maculopathy. Arch Ophthalmol 120:1551-1558.2002) and Freeman (Freeman E, Muñoz B, West S K, Tielsch J M, Schein O D. Is there an association between cataract surgery and age-related macular degeneration? Am J Ophthalmolm 135(6): 849-856.2003) have argued that there is a higher risk of ARMD for those who have undergone cataract operations. However, earlier research by Wang (Wang J J, Mitchell P, Cumming R G, Lim R. Cataract and age-related maculopathy: the Blue Mountains Eye Study. Ophthalmic Epidemiol 6: 317-326.1999) and McCarty (McCarty C A, Mukesh B N, Fu Cl, Mitchell P, Wang J J, Taylor H R. Risks factors for age-related maculopathy: the Visual Impairment Project. Arch Ophthalmol 119:1455-1462.2001) reject this hypothesis, perhaps due to the less advanced level of technology applied to the diagnostic measurements. Optic coherence techniques such as tomography, which provide a more rigorous, immediate and non-invasive way of monitoring the evolution of retinal neurodegenerative processes, are quite recent. This is very important in coming to know the determining effect of the natural pigments that absorb harmful radiation.

Other techniques have been developed for protecting cataract-operated eyes from shortwave lengths:
  There are a number of filters with yellow pigmentation on the market. However, there is still no procedure and/or device for applying these filters to the human eye as a therapeutic and preventative measure working as a substitute and/or improvement for natural protection.
  Intraocular lenses treated with a yellow filter began to be implanted in cataract-operated eyes back in the 90's. Such a surgical procedure is an alternative with obvious risks and difficulties. Many patients who have undergone cataract operations have had a transparent intraocular lens implanted to substitute for the natural lens. Such lenses do not have the needed yellow pigment protection. Such cases call for complementing the artificial lens with some kind of support system for the yellow pigment—for example, the ophthalmologic lens that is the subject of this patent request.

Certain patents have been developed in relation to this technique (for healthy eyes, as well as pseudo-aphakic and/or eyes in the neurodegeneration process). They are, however, significantly different from the present invention.

There are, on the one hand, other inventions that involve the application of some light-absorbent element on a covering surface:
  Improved coverings that include a soluble system that is UV ray absorbent, as well as a free radical eliminator. Such coverings are used to improve the resistance of a barrier to protect against graffiti and other marks. (NZ329912).

Manufactured light protector made of sheets or textiles that are affixed to windows by means of clasps or tape (DE 102005013404).

Ultraviolet light-absorbent material and its use (EP1770139).

Infrared ray-absorbent material and film for agriculture (JP2002146337).

Ultraviolet radiation-resistant film or coverings for climate protection (ES2153764).

UV light-absorbent plastic protector for use in sun bathing (GB2280678).

UVA ray-blocking material containing particles (WO9842909).

UVA ray-absorbent material (US20060076542).

These patents differ from the present invention is that none is aimed at eye protection or therapy. Rather, they are designed to be used for protecting surfaces, protecting plants from the climate, or protecting human skin.

There are, on the other hand, inventions for eye protection and prophylaxis involving the use of the yellow filter on other surfaces that are not coverings:

Therapeutic contact lenses for pseudo-aphakic eyes and/or eyes in the process of neurodegeneration (US2006238703).

Therapeutic and prophylactic lenses for pseudo-aphakic eyes and/or eyes in the process of neurodegeneration (US2007188701)

Lighting devices with therapeutic and prophylactic filter for healthy or pseudo-aphakic eyes, and/or eyes in the process of neurodegeneration (ES2281301)

Vehicle components for protecting healthy eyes, or therapeutic/prophylactic components for pseudo-aphakic eyes, and/or eyes in the process of neurodegeneration (ES2281303).

All of these patents belong to the inventor of the present invention. The novelty in the present invention, in relation to the aforementioned patents, is found in the fact that the filter is applied to a different element—a covering, coating or screening material for eye therapy and protection from the effects of the blue light present in all solar as well as artificial light.

Finally, there are other patents involving light filters that differ from the present invention in terms of their purpose and use; none of them has the objective of eye protection and/or prevention from shortwave lengths in order to prevent or mitigate the neurodegenerative processes of the retina:

Optical means for improving or modifying colour vision, along with the applicable method (U.S. Pat. No. 5,774,202), using a colour filter with a concrete transmission range, which can be used on any surface, including glass.

Visual distinction filter (JP61087106) for preventing light changes following a change in tone, reducing the load on the eyes by providing the maximum possible absorption.

Ultraviolet filter and glass comprised of this filter (JP10020347), which allows a varying and adaptable amount of this radiation to pass through.

Electromagnetic filter (JP2000349542 and JP2000349541) which protects from certain magnetic frequencies received, for example, through windows.

Absorption filters for colour exposition devices (U.S. Pat. No. 5,121,030) that improve visibility under high levels of light intensity through the application of dyes.

Colour enhancement filter and method for improving human vision (U.S. Pat. No. 6,158,865). This includes a filter for improving vision in all light environments—extreme environmental light as well as low illumination levels—as well as an adaptor ring for the filter.

Specific optical filters for certain activities, as well as optical accessories that employ these filters (U.S. Pat. No. 6,893,127), that help to improve the visualisation of objects, e.g., in sports.

DESCRIPTION OF THE INVENTION

Generally, the goal of the invention is the prevention and protection of the eyes from the absorption of blue and violet light, by means of a filter applied to covering, coating or screening material. As mentioned, this is particularly useful in the case of pseudo-aphakic subjects, in that it functionally compensates for the extraction of protective pigments (which are extracted during cataract surgery). It is also useful in cases of neurodegeneration in order to strengthen the prophylactic effect (both of these processes occur frequently amongst the older population). Such protection, however, is equally as important for keeping the eyes of any person healthy.

The invention works through the application, on covering materials, of a yellow pigmentation filter that absorbs shortwave lengths from 500 to 380 nm. By way of example, this element may be applied to materials intended for manufacturing awnings, parasols, insolating materials or protection screens of any type.

Accordingly, the element combines three components:

One or a number of materials for covering, coating or screening.

An assembly or device for applying the filter to the material.

The application of a yellow pigmentation filter available on the market that is compatible with the material, which absorbs shortwave lengths from 500 a 380 nm, on the light transmission area of the material surface.

EMBODIMENT OF THE INVENTION

There are a number of ways to apply the invention, depending on the specific material upon which the filter is to be applied. One application method is illustrated by the following example, although there are many other forms and combinations for manufacturing the element.

Example of invention manufacture:

A yellow colour filter is prepared, choosing from those available on the market, e.g., the generic "Yellow 191" dye ($C_{17}H_{13}ClN_4O_7S_2Ca$).

A support material, or device available on the market, is prepared in order to apply the filter to the coverage material of, for example, a plastic parasol.

The yellow colour filter is applied to the face (or faces) of the material, in such a way as to cover the desired light transmission area.

In conclusion, the combination of covering, coating or screening materials with a yellow filter makes it possible for any individual to protect healthy eyes from shortwave lengths, for cataract-operated patients with an implanted transparent intraocular lens to correct the lack of protection for the operated eye, and for those undergoing neurodegenerative eye processes to improve and increase natural protection. This method avoids the problems found with the market alternatives: filters without an application device and intraocular lenses.

The invention claimed is:

1. Covering material for the protection and therapy of healthy eyes from short wavelengths, said covering being the result of applying a yellow pigmentation filter that absorbs short wavelengths from 500 to 380 nm on sun-covering materials wherein the filter does not absorb other wavelengths.

2. Material for the protection of healthy eyes from short wavelengths according to claim 1, comprising a yellow pigmentation filter appropriate for use with the application material or materials.

3. Material for the protection of healthy eyes from short wavelengths according to claim 1, that comprises one or more covering, coating or screening materials.

4. Material for the protection of the eyes from short wavelengths according to claim 1, in which the materials are those intended for manufacturing awnings, parasols or insulating materials or protection screens of any type.

5. Material according to claim 1, characterised by its filtering quality.

6. Covering material for the protection and therapy of pseudo-aphakic eyes from short wavelengths, characterised in that said material results from the application of a filter with yellow pigmentation that absorbs short wavelengths from 500 to 380 nm onto sun-covering materials wherein the filter does not absorb other wavelengths.

7. Therapeutic and prophylactic material for pseudo-aphakic eyes according to claim 6, that comprises a yellow pigmentation filter appropriate for use with the application material or materials.

8. Therapeutic and prophylactic material for pseudo-aphakic eyes according to claim 6 that comprises one or more of covering, coating or screening materials.

9. Therapeutic and prophylactic material for pseudo-aphakic eyes according to claim 6, in which the materials are intended for manufacturing awnings, parasols or insulating materials or protection screens of any type.

10. Material according to claim 6, characterised by its filtering quality.

11. Covering material for the protection and therapy of eyes undergoing retinal neurodegenerative processes from short wavelengths, characterised in that said material results from the application of a yellow pigmentation filter that absorbs short wavelengths from 500 to 380 nm onto sun-covering materials wherein the filter does not absorb other wavelengths.

12. Therapeutic and prophylactic material for eyes undergoing retinal neurodegenerative processes according to claim 11, that comprises a yellow pigmentation filter appropriate for use with the application material or materials.

13. Therapeutic and prophylactic material for eyes undergoing retinal neurodegenerative processes according to claim 11, that comprises one or more covering, coating or screening materials.

14. Therapeutic and prophylactic material for eyes undergoing retinal neurodegenerative processes according to claim 11, in which the materials are intended for manufacturing awnings, parasols or insulating materials or protection screens of any type.

15. Material according to claim 11, characterised by its filtering quality.

* * * * *